Figure 1:
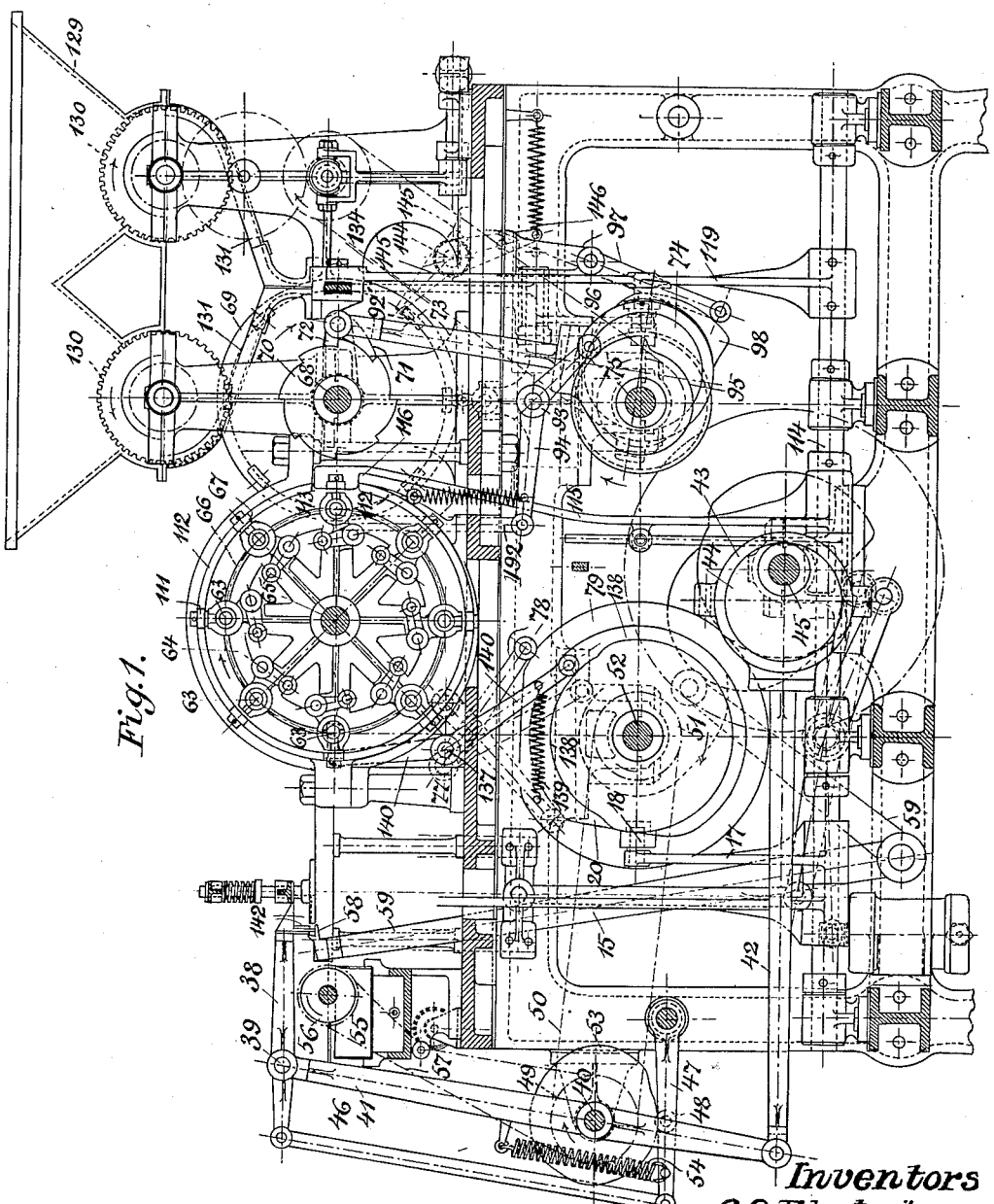

G. C. EKSTRÖM, B. A. E. JOHNSON AND G. ÖRSTRÖM.
MACHINE FOR MAKING CARTONS.
APPLICATION FILED JULY 9, 1919.

1,379,254.

Patented May 24, 1921.

7 SHEETS—SHEET 1.

Inventors
G. C. Ekström
B. A. E. Johnson
G. Örström

By H. R. Kerslake
Attorney

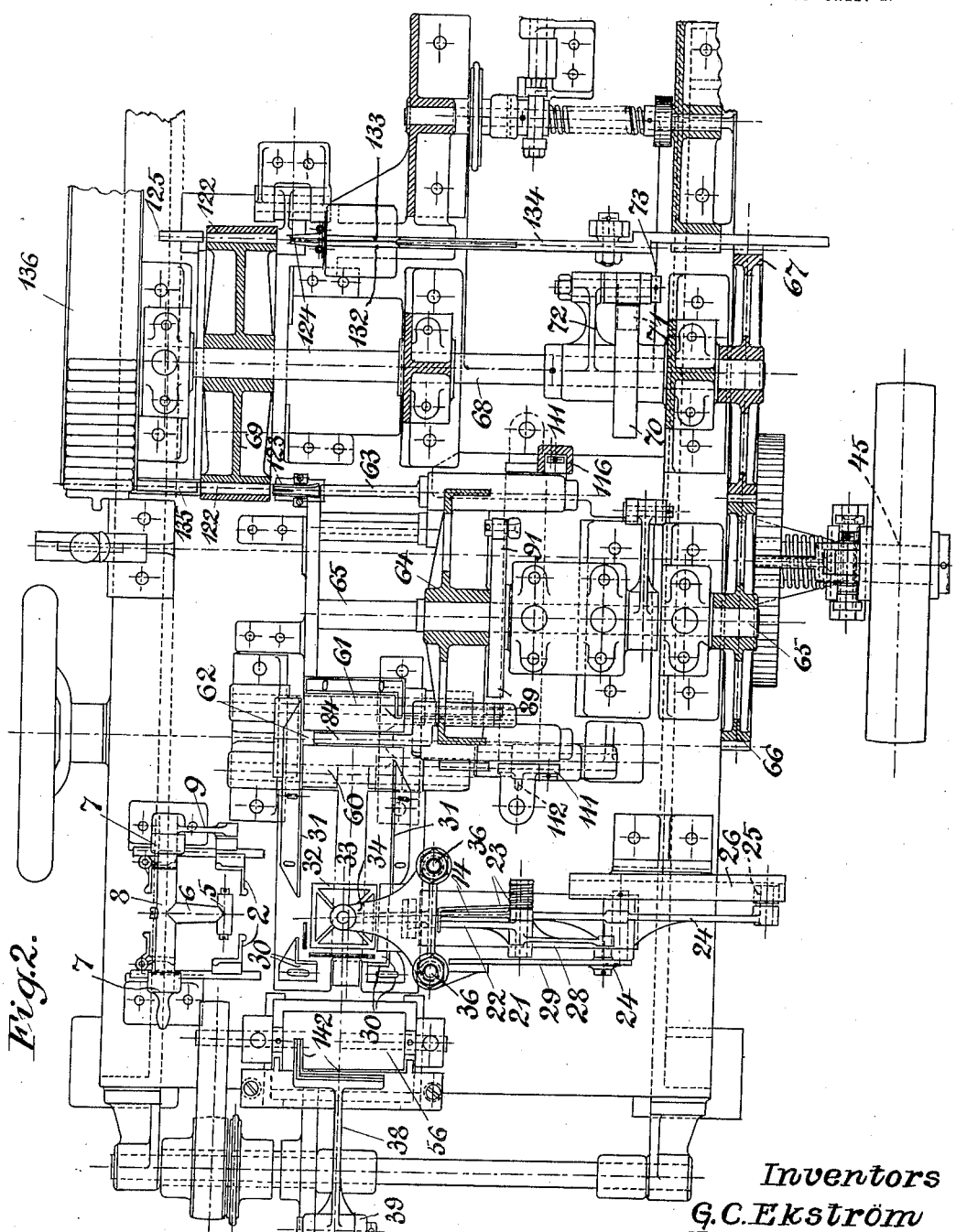

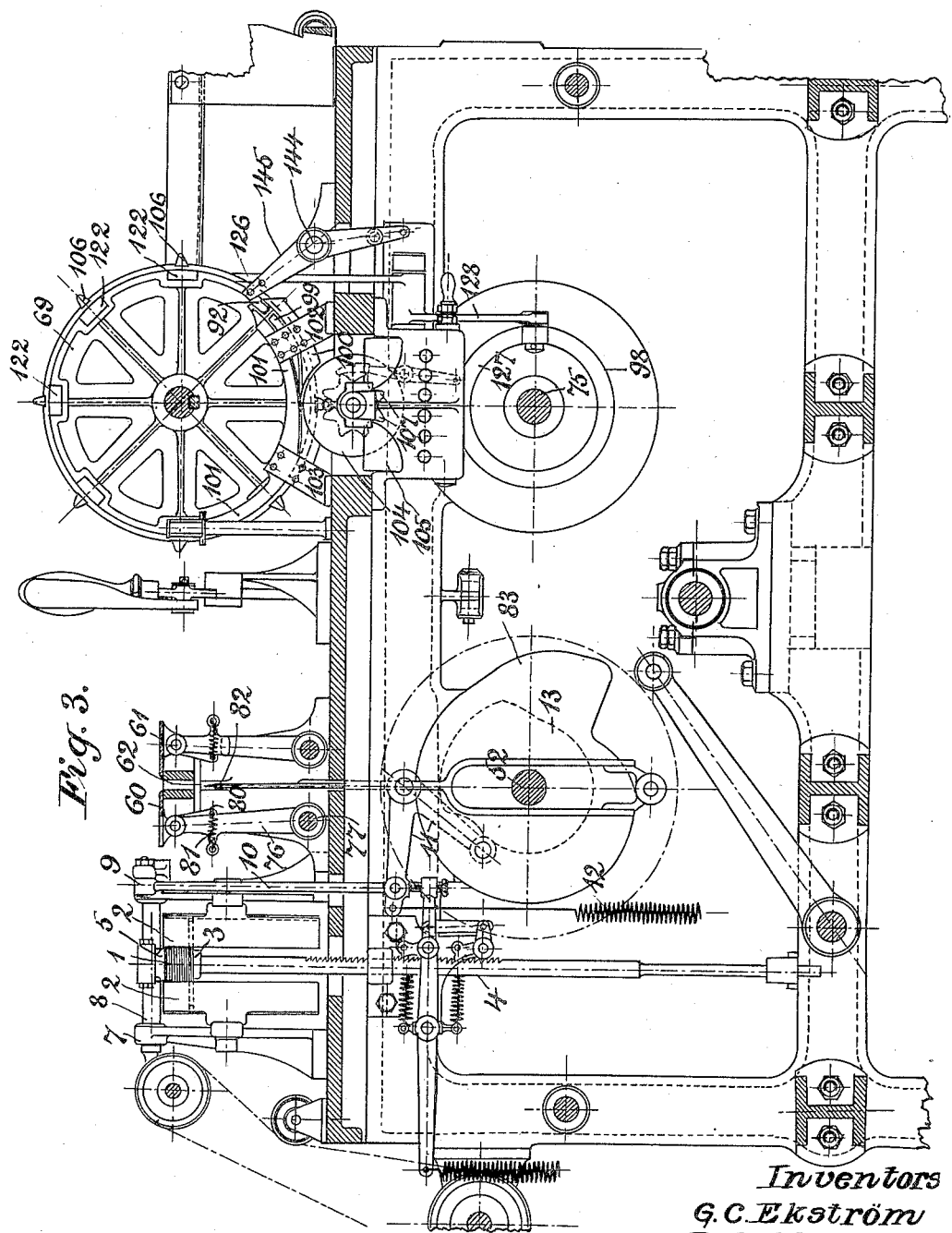

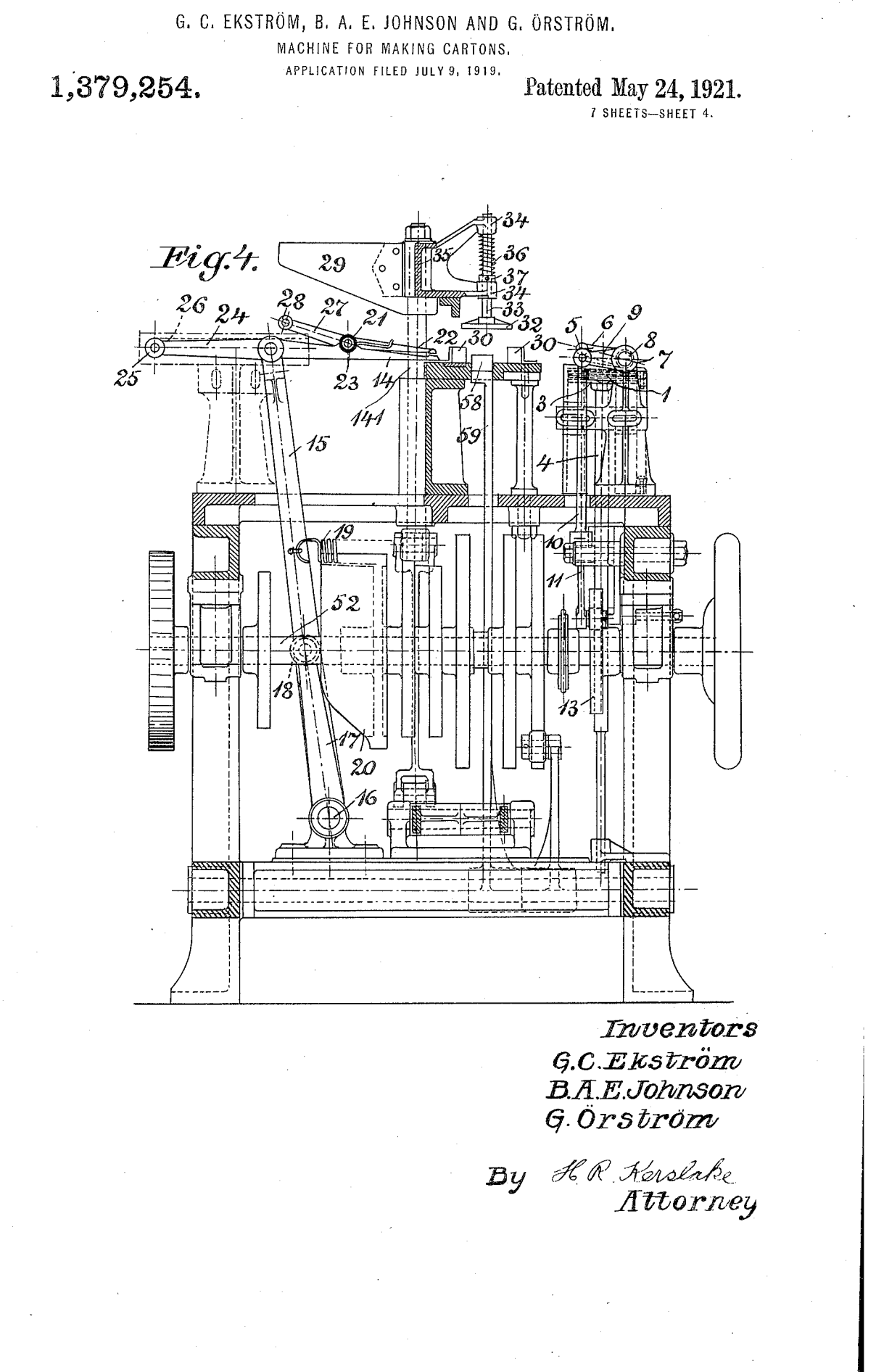

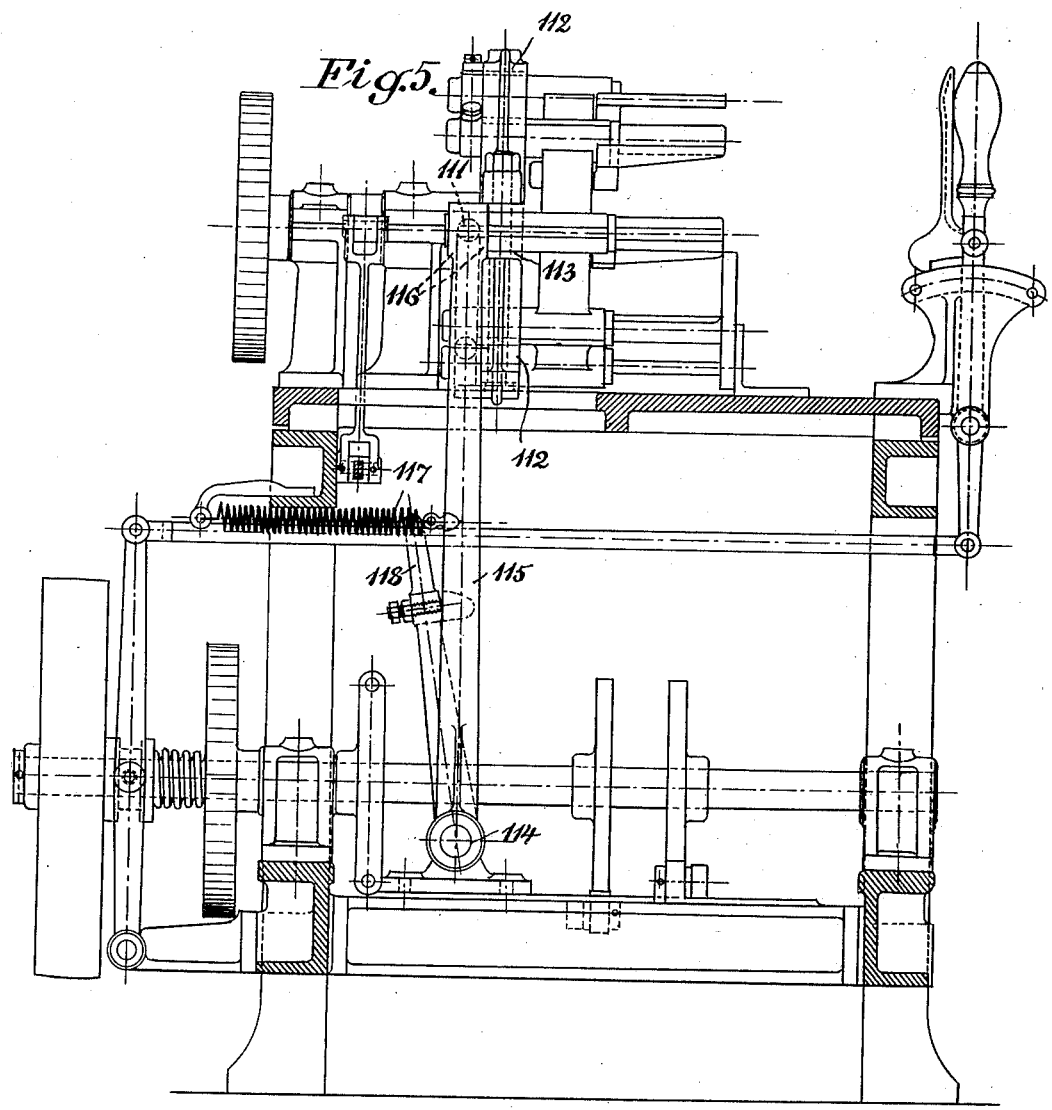

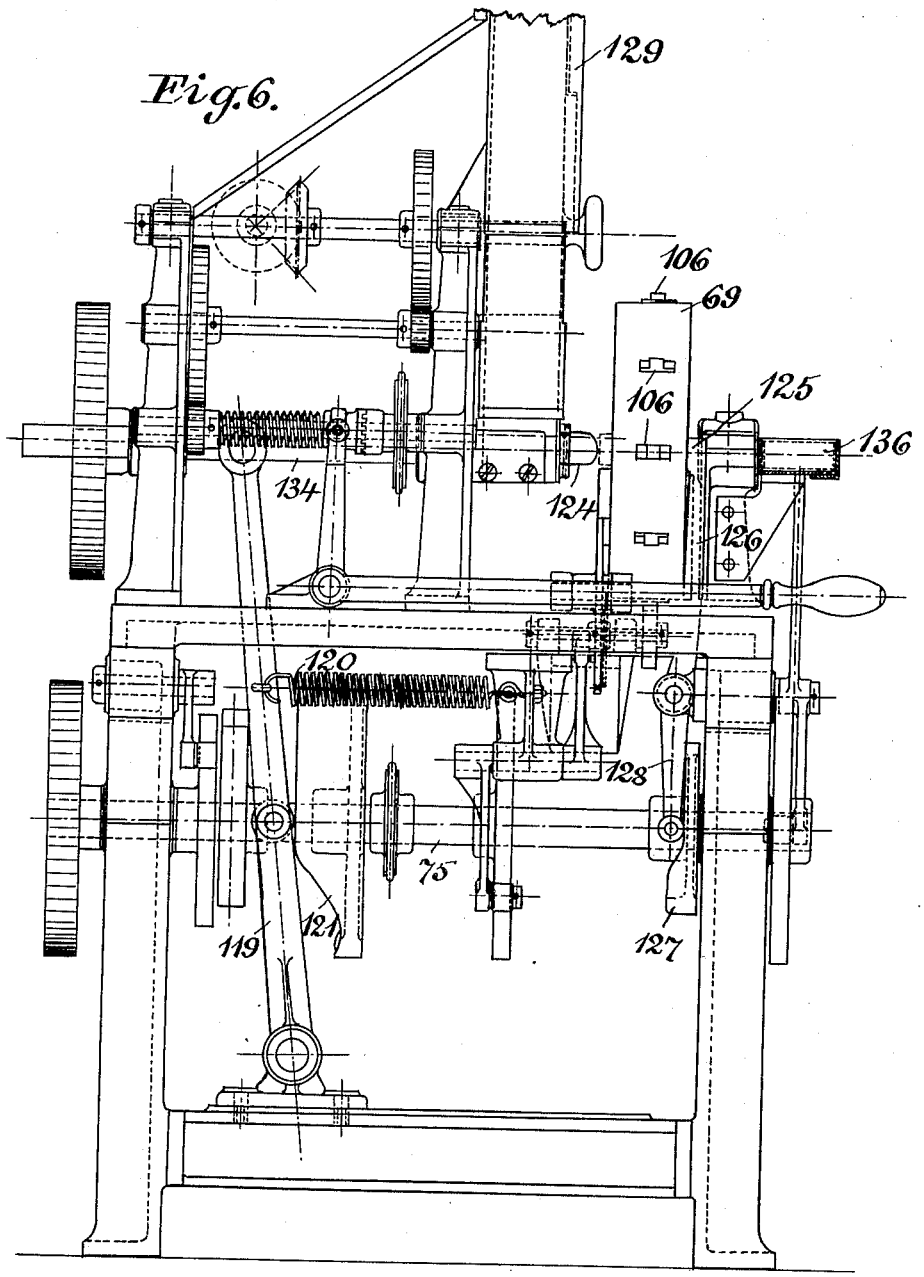

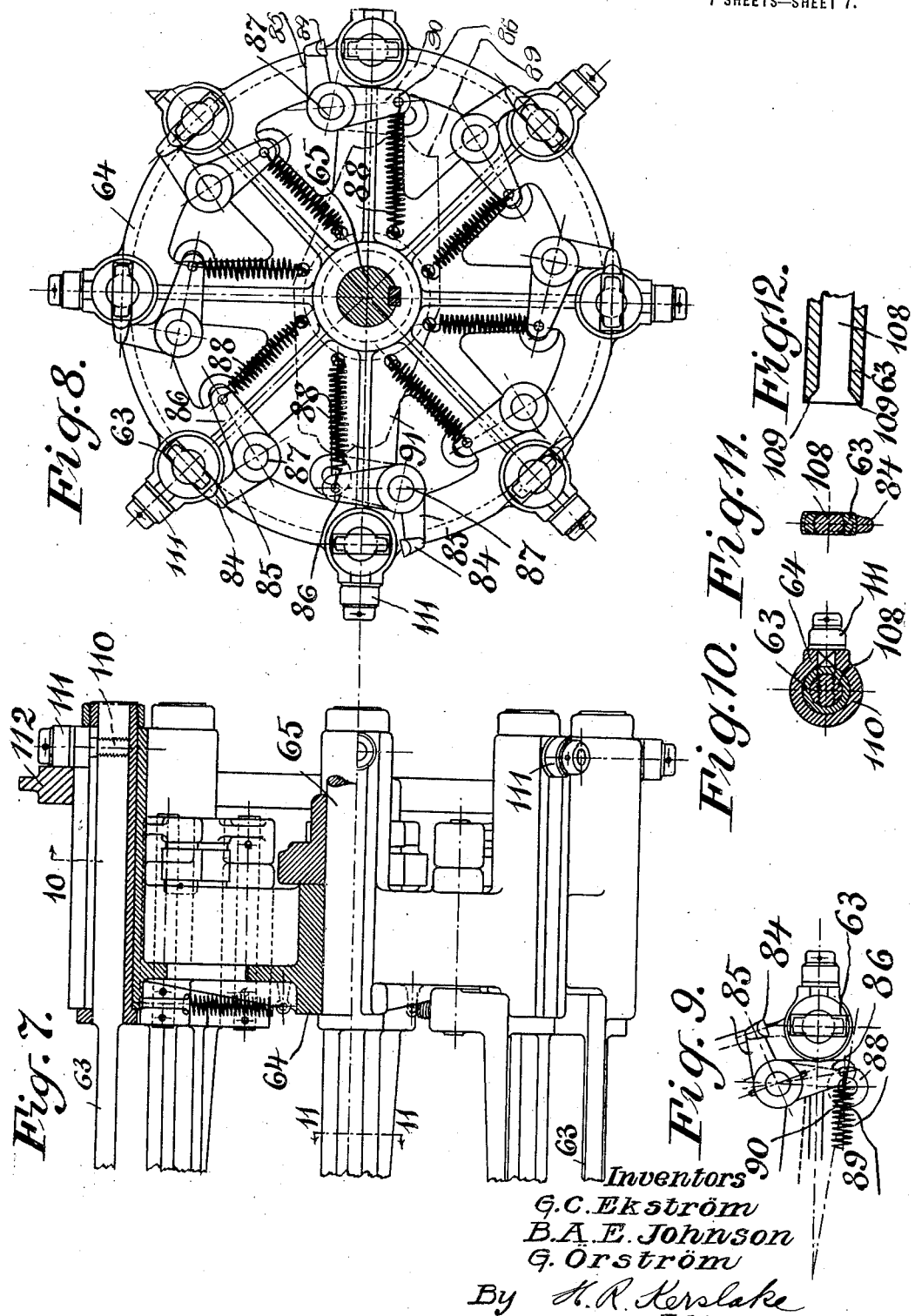

UNITED STATES PATENT OFFICE.

GUNNAR CHRISTIAN EKSTRÖM, BROR ANDERS EMIL JOHNSON, AND GUSTAF ÖRSTRÖM, OF STOCKHOLM, SWEDEN, ASSIGNORS TO AKTIEBOLAGET GEHR. ARRHNS MEKANISKA VERKSTAD, OF STOCKHOLM, SWEDEN, A CORPORATION OF SWEDEN.

MACHINE FOR MAKING CARTONS.

1,379,254.      Specification of Letters Patent.     Patented May 24, 1921.

Application filed July 9, 1919. Serial No. 309,745.

*To all whom it may concern:*

Be it known that we, GUNNAR CHRISTIAN EKSTRÖM, a subject of the King of Sweden, and resident of Eriksbergsgatan 14, Stockholm, in the Kingdom of Sweden, BROR ANDERS EMIL JOHNSON, a subject of the King of Sweden, and resident of Observatoriegatan 7, Stockholm, in the Kingdom of Sweden, and GUSTAF ÖRSTRÖM, a subject of the King of Sweden, and resident of Pålsundsgatan 6, Stockholm, in the Kingdom of Sweden, have invented certain new and useful Improvements in Machines for Making Cartons, of which the following is a specification, reference being had therein to the accompanying drawings.

This invention relates to a machine for making capsules for packing matches, cigarettes or the like and, if wanted, for filling the said capsules with matches, etc., and finally folding over the end flaps and pasting together the same. The capsule is made, as usual, by folding a sheet of paper or any other suitable material around a mandrel. According to the invention the machine is provided with a plurality of such mandrels, which are moved in an endless path. After the sheet has been folded around one of the said mandrels, the latter together with the sheet is moved further for the folding of the bottom flaps of the capsule and the pasting together of same. While the folding of the sheet is completed a new sheet is folded around the subsequent mandrel and so on. In this manner a plurality of capsules are folded simultaneously, the capacity of the machine being thus essentially increased. After the sides and bottom of the capsules have been folded and the parts pasted together the capsules are put into partitions provided in a carrier, which move the partitions in an endless path located partially in the path of the said mandrels, so that the capsules can be moved directly from the mandrels into the said partitions. The capsules are each charged with a set of matches, while located in the said partitions, the other end of the capsules being then folded over and the flaps pasted together. The said folding operation is partially effected, while the partitions are moved, pasting being simultaneously effected. Consequently, also the operations at the carrier of the partitions are effected as continuously as possible, so that the capacity of the device for charging the capsules with matches, etc., is equal to the capacity of the device for making the capsules.

One form of the invention is shown in the accompanying drawings. The machine described in the following specification is adapted for making capsules for cigarettes and charging the same with cigarettes.

Figure 1 is a side view of the machine and Fig. 2 is a top view of the same. Fig. 3 is a longitudinal section of the machine and shows a fold table, a rotary drum with partitions for receiving the capsules and charging the same with cigarettes and the folders and the pasting device operating at the said drum. Fig. 4 is an end view of the machine and shows the mechanism for transmitting the paper sheets from a magazine, containing the same, to a paste stamp. Fig. 5 shows, viewed from one of the ends of the machine, a rotary disk and mandrels, which are carried by the said disk and around which the capsules are formed. Fig. 6 is an end view of the machine and shows a magazine, containing the cigarettes, and a rotary drum provided with partitions for receiving the capsules. Figs. 7 and 8 show in a side view (partially in section) and in an end view respectively the rotating disk carrying the mandrels around which the sheets are folded. Fig. 9 is an end view of one of the mandrels and a presser coöperating with the same for forcing the edges of the folded sheet against one another. Fig. 10 is a section on the line 10 of Fig. 7. Fig. 11 is a section on the line 11—11 of Fig. 7. Fig. 12 is a longitudinal section of a part of a mandrel and an ejector for moving the capsule from the mandrel.

The paper sheets 1, from which the capsules are made, are located in a magazine 2, in which they are supported by a table 3, Figs. 2–4. The said table is raised step by step by means of a toothed bar 4, movable in guides provided in the frame of the machine, and a pawl mechanism actuated by a cam disk; the said mechanism is not described, as it forms no part of this invention. The top sheet in the magazine 2 is caught at one of its edges by a section mouth piece 5, which is carried by and communicates with a hollow arm 6, extending from a hollow shaft 8, open at its one end and journaled in bearings 7 on the frame of the machine. A hose, not shown, connects the open end of the shaft 8 with a pump. The said pump may consist of a cylinder and a piston, movable in the same, which piston against the action of a spring is actuated by a cam disk, which is rotated by the driving shaft of the machine and, as the mouth piece 5 bears against the said sheet, moves the piston, so that vacuum is created in the mouth piece and the sheet is held by the same. From the shaft 8 an arm 9 extends, which by a link 10 is connected with a swingable bell crank lever 11, swingably mounted in the frame of the machine. The said lever 11 is actuated against the action of a spring 12, by a cam disk 13, which is provided on one 52 of the cam shafts of the machine and raises the mouth piece 5 from the pile of paper sheets, while simultaneously suction is effected in the mouth piece, so that it carries with itself the top sheet of the said pile. The sheet thus raised is seized by a tongs, the one jaw 14 of which is pivoted to an arm 15 extending from a shaft 16 journaled in the frame. From the said shaft a second arm 17 extends provided with a roller 18, which by a spring 19, fixed to the arm 15 and the frame, is forced against a cam disk 20 on the shaft 52. The other jaw 22 of the said tongs is swingably mounted on a pin 21 in the jaw 14 and is forced against the said jaw by a spiral spring 23 provided on the said pin 21. From the jaw 14 an arm 24 extends backward and is provided with a roller 25, engaging a stationary guide groove 26. From the jaw 22 an arm 27 extends backward and is provided with a roller 28, which in predetermined moments is actuated by a cam plate 29 carried by a rod 141, which is moved up and down in the manner stated below. As the arm 15 with the tongs is moved toward the right, Fig. 4, the jaws 14, 22 of the tongs are raised by the groove 26 and for the purpose stated below and are then lowered into a position suitable for seizing the sheet raised by the mouth piece. As the tongs is moved toward the right, the jaw 22 is moved from the jaw 14 by the lowered cam plate 29 and, as the tongs is returned, during which movement the cam plate 29 is raised for a short distance, the spring 23 forces the jaw 22 toward the jaw 14, so that the tongs seizes the sheet and carries it with itself. At the end of the return movement of the tongs the cam plate 29 opens the tongs. The tongs then locates the sheet between a pair of angular pieces 30, fixed to the table of the machine, and a pair of guide rules 31, which together impart to the sheet a predetermined position on the said table. The raising of the tongs, mentioned above, is necessary in order that the tongs may be able to move the sheet above the piece 30 and the guide rule 31, which are located nearest to the magazine 2. After the sheet has been brought into the said position on the table, a plate or stamp 32 is lowered and forced against the sheet, in order to hold the same, while it is subsequently provided with paste. The said plate 32 is fixed to a rod 33, moved upward and downward in arms 34 of a bracket 35. A spiral spring 36 is provided on the rod 33 and bears against the top arm 34 and a ring 37 fixed on rod 33, so that the plate can yield after it has struck the sheet located on the table. The said bracket 35 is fixed to two vertical rods 141, movable in guides. The rods 141 together with the plate 32 are moved by a suitable lever and cam disk mechanism, which is not described, as it may be of any suitable construction. As the plate 32 is forced against the sheet, ribs provided on its lower side together with corresponding grooves provided in the table of the machine produce impressions in the sheet at such places, that the folding of the sheet into a capsule is facilitated. While the sheet is held by the plate 32 an angular paste stamp 142 is forced against the same, Figs. 1 and 2. The said stamp 142 is carried by an arm 38, pivoted at 39 to a lever 41 swingable on a shaft 40. The lower arm 41 of the said lever 41 is connected with the rod 42 of the strap 43 of an eccentric 44, fixed to driving shaft 45, so that the paste stamp is reciprocated. Besides, the said arm 38 is connected with a link 46, connected with an arm 47, pivoted to the frame of the machine and provided with a roller 48, which is forced against a cam disk 53 on the shaft 40, by a spring 54 fixed to the arm 47 and the lever 41. The said disk 53 is rotated on the shaft 40 from the cam shaft 52 by means of a chain 50 and sprocket wheels 49, 51. While the arm 38 is reciprocated, it is raised and lowered through the coöperation of the cam disk 53 and the spring 54, the paste stamp 142 being thus moved over and brought into contact with a roller 56 rotating in a receptacle 55 containing paste. The stamp, thus provided with paste, is forced against the sheet held by the plate 32 and applies paste on the same along two lines, one of which extends along one of the longitudinal edges of the sheet, so that the said edges are pasted together during the subsequent folding operation, while the other one extends along one of the transversal edges of the sheet for pasting together the bottom flaps of the capsule. Roller 56 is rotated by the shaft 40 by means of a chain 57 or the like and sprocket wheels. After the sheet has been provided with paste in the stated manner and the plate 32 has been raised, the sheet is pushed forward on the table onto the place of the machine, in which it is folded, the said moving being effected by a fork shaped part 58, carried by a swingable arm 59, which is swung forward and backward by a cam disk 143 on the shaft 45. The said arm 59 places the sheet on two folders 60, 61 adapted to fold the longitudinal side parts of the sheet and located at opposite sides of an opening 62 in a fold table, Figs. 2 and 3, through which opening the mandrels 63 pass, around which the sheet is folded.

As stated above, the machine is provided with a plurality of mandrels, which are moved in an endless path. In the drawings the mandrels 63 are carried by a disk 64, Figs. 1, 2 and 7–11. The said disk is fixed to a shaft 65, which by means of a gearing 66, 67 is rotated by a shaft 68, carrying a rotary drum 69, described below and provided with partitions for receiving the capsules from the mandrels 63. The disk 64 and the drum 69 are rotated intermittently in the direction indicated by the arrows by a ratchet wheel 70 fixed to the shaft 68, and a pawl 71 engaging the same, which pawl is pivoted to a swingable arm 72, connected with the rod 73 of the strap of an eccentric 74 fixed to a cam shaft 75. By the described driving mechanism the mandrels 63 one after the other are located into the opening 62, each mandrel bringing with itself the paper sheet resting on the folders 60, 61, so that the sheet is folded round or forced against three sides of the mandrel. The mandrel stops, when its top side is flush with the top side of the fold table, and is held in the said position by a hook shaped arm 140, which engages a recess in the disk 64. The said arm 140 swings on a pin 137 and is acted upon by a cam disk 138 and a spring 139. The folders 60, 61 are then moved across the mandrel, first the folder 61, Fig. 3, which forces the upstanding edge part of the capsule downward to the mandrel, and then the folder 60, which folds the opposite edge part, provided with paste, against the edge part first folded. The said folders 60, 61 are arranged in the same manner, for which reason only one of the same is described. The folder consists of a plate, hinged to an arm 76 on a shaft 77, from which an arm 78, provided with a roller extends downward, Fig. 1. The said arm 78 is forced against a cam disk 79 on the shaft 52 by a spring. From the folder 60 an arm 80 extends downward, between which and the arm 76 a spring 81 is provided, which forces the folder against the fold table.

In order to secure the holding of the sheet against the mandrel 63, while the latter is lowered in the opening 62, a bar 82 or the like, Fig. 3. is provided in the said opening, which, acted upon by a spring bears against the mandrel and is lowered simultaneously with the same by a cam disk 83. After the sheet has been folded, the counteracting bar 82 is lowered for such a distance, that the mandrel can pass through the opening 62 and farther downward. The edge parts of the sheet folded over the top side of the mandrel are forced against one another and the mandrel, for the effecting of sharp corners in the capsule and for insuring the pasting together of the edges, by a presser 84, carried by an angular arm 85, 86 provided on a shaft 87 journaled in the disk 64. A spring 88 is connected with the said angular arm and with the disk and tends to move the presser 84 toward the mandrel. For holding the presser 84 at some distance from the mandrel 63, so that the folders 60, 61 may be able to fold the edge parts of the sheet against the mandrel, a cam disk 89 is swingably mounted on the shaft 65, which, when the mandrel occupies the rightmost position in Fig. 8, acts upon an arm 90 on the shaft 87 and holds the presser 84 in the shown position. At the opposite side of the shaft 65 a similar cam disk 91 is provided, made integral with the cam disk 89 and keeping the presser at a distance from the mandrel, while the capsule is pushed from the mandrel. In order that the presser 84 may be forced against the mandrel immediately after the folding of the edges of the sheet, the cam disk 89 (together with the cam disk 91) is swingably mounted on the shaft 65 and by means of a link 192, Fig. 1, connected with a two armed lever 94 swingably mounted at 93 and acted upon by a cam disk 95 on the shaft 75, which is so shaped, that it moves the cam disk 89 from the position shown in Fig. 8 immediately after the folding of the edges of the sheet, so that the presser is forced against the same. The presser continues in bearing against the edges of the sheet, until the mandrel 63 arrives to the position on the opposite side of the shaft 65, in which position the presser is moved from the mandrel by the cam disk 91 in order to permit the capsule to be pushed from the mandrel in the manner described below.

After the mandrel 63 has passed through the opening 62 and passes further downward, the bottom flaps of the capsule are folded. This is effected in the same manner as the folding of the flaps at the opposite side of the capsule, which is effected while the capsule is in the drum 69 and contains cigarettes. For that reason only such parts are described, as fold the end flaps of the capsule filled with cigarettes. The said parts are shown in Figs. 1 and 3. 92 is a tongue, which is fixed to a two armed lever 145, swingable on a pin 144 and acted upon by a two armed lever 97 against the action of a spring 146. The said lever is acted upon by a cam disk 98 on the shaft 75. As the said tongue 92 is moved toward the left by the spring 146, it folds the flap at one of the short sides of the capsule. The folding of the flap at the opposite short side of the capsule, which takes place first, is effected by a stationary tongue 99, which during the rotation of the drum 69 acts upon the said flap. Also the other side flaps of the capsule are folded by stationary folders 100, 101, which together with the tongue 99 are fixed to arms 102, 103 in the frame of the machine. The said folders 100, 101 consist of plates, which are located at opposite sides of the path of the capsule and the acting surfaces of which successively extend inward over the path of the capsule, so that they bend the flaps of the capsule respectively inward toward the same. The plate 100 acts first and folds the corresponding flap, while the other flap still extends longitudinally of the capsule. The flap last mentioned passes a rotating roller 104, which extends into a tank 105 containing paste, so that the said flap is provided with paste during its contact with the said roller 104. The roller 104 is rotated by teeth 106 provided on the drum 69 and engaging a toothed wheel 107 connected with the roller. After the flap has been provided with paste, it is folded by the plate 101. The said plate 101 extends along the drum 69 to the place, in which the capsule, filled with cigarettes, is pushed out from the drum, so that the flaps stick firmly to one another. The folding device provided at the disk 64 for folding the end flaps of the capsule, has no paste roller, as the outer flap has been provided with paste by the stamp 142.

After the bottom flaps of the capsule have been folded and pasted together, the capsule is pushed from the mandrel 63. This is effected by a rod 108, which is movable in the mandrel 63 and at its outer end has two projections 109, extending in opposite directions, Fig. 12. The end surface of the said rod and the projections 109 are normally flush with the end surface of the mandrel 63. The mandrel may be thought as originally consisting of a tube, in which a cylindrical rod is mounted the end of which consists of a round disk. The said tube together with the said rod and disk has then been cut off longitudinally and for a part of its length along two parallel planes located at opposite sides of the axis of the tube. Consequently, the end flaps of the capsules are folded toward the end of the rod 108 and the projections 109.

A pin 110 is fixed to the rod 108 and extends through a longitudinal slot provided in the cylindrical part of the mandrel and in the part of the disk 64, to which the mandrel is fixed, as shown in Fig. 10. The said pin 110 has a roller 111. The latter bears against a stationary ring 112, which extends around the disk 64 and has such a position, that it keeps the rod in its retracted position in the mandrel. In the said ring 112, however, an opening 113 is provided, Fig. 1, located at the place, where the capsule is pushed from the mandrel. At the said place an arm 115 is provided, Figs. 1 and 5, which is swingably mounted on a shaft 114 and the top end of which has a lateral fork 116, Fig. 2, which the roller 111 enters during the rotary motion of the disk 64. While the roller is located in the said fork 116, the latter is moved toward the free end of the mandrel, bringing with itself the ejector rod 108, so that the said rod pushes the capsule from the mandrel 63. The said arm 115 then returns the rod 108 into its original position, in which it is locked by the ring 112 during the continued rotating of the disk 64. The arm 115 is moved in one direction by a spring 117, Fig. 5, and in the opposite direction by an arm 118, fixed to the shaft 114 and acting upon the arm 115 by means of an adjustable screw. The said shaft is rocked at the proper moment by an arm 119 fixed to the same, Figs. 1 and 6, and provided with a roller, which by a spring 120, fixed to the arm 119 and the frame of the machine, is forced against a cam disk 121 on the shaft 75.

While the capsule is pushed from the mandrel 63, one of the partitions 122 of the drum 69 is located in front of the same. There are as many partitions as mandrels 63 and the partitions and mandrels correspond in proper turns during the rotary motion of the disk 64 and the drum 69, so that one capsule is pushed into each partition. The transmitting of the capsule into the partition is effected through a funnel shaped mouth piece 123, Fig. 2.

During the rotary motion of the drum 69 the partition together with the capsule is moved into a position, at the right hand side, Fig. 2, where the capsule is to be charged with cigarettes. In the said position the capsule is pushed out from the partition for a short distance and is threaded on a mouth piece 124, through which the cigarettes are transmitted into the capsule. The said pushing operation is effected by a piston 125, Fig. 2, carried by a swingable arm 126, Fig. 3, which is moved by an arm 128 actuated by a cam disk 127 on the shaft 75 and a spring (not shown). The cigarettes are contained in a magazine 129, the bottom of which consists of two funnels. In each of the said funnels a drum 130 is mounted, provided in its surface with longitudinal grooves. The said drums 130 are rotated by a suitable gearing and receive cigarettes in the said grooves, which cigarettes are then delivered into chutes 131. The said chutes 131 communicate with a common chamber 132, adapted to contain for instance ten cigarettes, five cigarettes on each side of a plate 133 located in the center of the said chamber. From the chamber 132 the said cigarettes are pushed through the mouth piece 124 and into the capsule by a piston 134 movable in guides provided in the frame of the machine, after which operation the capsule is pushed into the partition of the drum 69, while the piston 125 is retracted. The said capsule is pushed into the partition only for such a distance, that the end of the same extends somewhat outside the drum, so that the capsule may be closed in the manner stated above. The said piston 134 is moved by the arm 119 mentioned above. As the closed end of the capsule, containing cigarettes, during the rotation of the drum corresponds with one of the mandrels 63 ready to deliver a capsule to the drum 69, the capsule last mentioned pushes the capsule, containing the cigarettes, into a passage 135, from which it is pushed into a channel 136 by the next capsule, containing cigarettes, for further transportation.

Gearings and other devices used for transmitting motion from the driving shaft 45 to the cam shafts of the machine and to the drums 130 are not described, as they may be of any suitable construction.

Owing to the fact that the disk 64 together with the mandrels 63 and the drum 69, containing the partitions, operate, so to say, continuously and the disk 64 delivers capsules to the same extent as they are charged with cigarettes, a considerably greater number of capsules may be manufactured by the day than by capsule making machines hitherto used, and besides the charging of the capsules is effected more rapidly than in machines especially constructed for that purpose. The machine may evidently by some slight modifications be used also for charging the capsules with other articles than matches or cigarettes, for instance for packing straws, used for the consuming of iced drinks, which straws are each put in a capsule. The machine may evidently be arranged for the manufacture of capsules only, in which case the drum 69 and parts coöperating with the same are omitted.

Having now described our invention, what we claim as new and desire to secure by Letters Patent is:

1. In a machine for making capsules from sheets of paper or the like and adapted to contain matches, cigarettes or similar articles, the combination with a fold table and side folders, of a plurality of mandrels, which are moved in an endless path and pass successively through the said fold table, a sheet of paper, etc., being folded around each of the said mandrels, a presser for each mandrel provided on the carrier of the mandrels, respectively and swingable around an axis extending longitudinally of the mandrel, said presser forcing the folded side edges of the sheet against the mandrel, means for forcing the presser against the mandrel and means for moving the presser from the mandrel, substantially as described and shown in the accompanying drawing.

2. In a machine for making capsules from sheets of paper or the like and adapted to contain matches, cigarettes or similar articles, the combination with a fold table and side folders, of a plurality of mandrels, which are moved in an endless path and pass successively through the said fold table, a sheet of paper, etc., being folded around each of the said mandrels, a presser provided at the mandrels respectively for forcing the folded side edges of the sheet against the mandrel and moving together with the same, means for forcing the presser against the mandrel, a cam disk for moving the presser from the mandrel and means for shifting the position of the said cam disk, so that the presser is forced against the mandrel immediately after the folding of the edges of the sheet.

3. In a machine for making capsules from sheets of paper or the like and adapted to contain matches, cigarettes or similar articles, the combination with a fold table and side folders, of a plurality of mandrels, which are moved in an endless path and pass successively through the said table, a sheet of paper being folded around each of the said mandrels, a swingable folder for folding one of the end flaps of the capsule against the end of the mandrel, a stationary folder, which is located in the path of the mandrel and during the motion of the mandrel folds the opposite end flap of the capsule, and stationary folders located at opposite sides of the path of the mandrels and consisting of plates or the like, the operating surfaces of which successively change from a position substantially parallel to the mandrel to a position forming substantially right angles to the same.

4. In a machine for making capsules from sheets of paper or the like and adapted to contain matches, cigarettes or similar articles, the combination with a fold table and side folders, of a plurality of mandrels, which are moved in an endless path and pass successively through the said fold table, a sheet of paper, etc., being folded around each of the said mandrels, a swingable folder for folding one of the end flaps of the capsule against the end of the mandrel, a stationary folder, which is located in the path of the mandrel and during the motion of the mandrel folds the opposite end flap of the capsule against the end of the mandrel, stationary folders located at opposite sides of the path of the mandrels and consisting of plates or the like the operating surfaces of which successively change from a position substantially parallel to the mandrel to a position forming substantially right angles to the same, a rod located in the mandrels respectively and movable longitudinally of the same, the enlarged end of which rod has substantially the same cross sectional shape as the mandrel, a swingable fork shaped lever arm, engaging the said rod in one of its positions in the endless path, and means for actuating the said lever arm, so that it causes the said rod to push the capsule from the mandrel.

5. In a machine for making capsules from sheets of paper or the like and adapted to contain matches, cigarettes or similar articles, the combination with a fold table and side folders, of a plurality of mandrels, which are moved in an endless path and pass successively through the said fold table, a sheet of paper, etc., being folded around each of the said mandrels, a swingable folder for folding one of the end flaps of the capsule against the end of the mandrel, a stationary folder, which is located in the path of the mandrel and during the motion of the mandrel folds the opposite end flap of the capsule against the end of the mandrel, stationary folders located at opposite sides of the path of the mandrels and consisting of plates, the operating surfaces of which successively change from a position substantially parallel to the mandrel to a position forming substantially right angles to the same, a rod located in each of the mandrels respectively and movable longitudinally of the same, the enlarged end of which rod has substantially the same cross sectional shape as the mandrel, a swingable fork shaped lever arm, engaging the said rod in one of its positions in the endless path, means for actuating the said lever arm, so that it causes the said rod to push the capsule from the mandrel, a ring, extending along the path of the mandrels and engaging the retracted rod, and an opening provided in the said ring at the place, in which the rod is engaged by the said lever arm.

6. In a machine for making capsules from sheets of paper or the like and charging the same with matches, cigarettes or similar articles, the combination with a fold table and side folders, of a plurality of mandrels, moved in an endless path and passing successively through the said fold table, the said sheets being folded around the said mandrels respectively, means for folding the end flaps of the capsules against the ends of the mandrels respectively, partitions moved in an endless path having such a position, that each of the partitions during their motion is located in front of one of the mandrels carrying a folded capsule, an ejector provided in each of the said mandrels, means for actuating the ejector of that mandrel, which registers with one of the partitions, so that the said ejector pushes the folded capsule into the said partition, a chamber containing matches, etc., and means for pushing matches from the said chamber into the capsules respectively contained in the said partitions.

7. In a machine for making capsules from sheets of paper or the like and charging the same with matches, cigarettes or similar articles, the combination with a fold table and side folders, of a rotatable carrier, a plurality of mandrels mounted on the said carrier, the said carrier being so located, that the mandrels successively pass through the said fold table, a sheet of paper being folded on each of the said mandrels, a rotatable drum, partitions provided in the drum, the said drum having such a position, that each of the partitions during the rotary motion of the drum is located in front of one of the mandrels carrying a folded capsule, an ejector provided in each of the said mandrels, means for actuating the ejector of that mandrel, which registers with one of the partitions, so that the said ejector pushes the folded capsule into the said partition, a chamber containing matches, etc., and means for pushing matches from the said chamber into the capsules respectively contained in the said partitions.

8. In a machine for making capsules from sheets of paper or the like and charging the same with matches, cigarettes or similar articles, the combination with a fold table and side folders, of a plurality of mandrels, moved in an endless path and passing successively through the said fold table, the said sheets being folded on the said mandrels respectively, means for folding the end flaps of the capsules, against the ends of the mandrels respectively, partitions moved in an endless path having such a position, that each of the partitions during their motion is located in front of one of the mandrels carrying a folded capsule, an ejector provided in each of the said mandrels, means for actuating the ejector of that mandrel, which registers with one of the partitions, so that the ejector pushes the folded capsule into the said partition, a chamber containing matches, etc., a piston located in front of the said chamber and at opposite side of the path of the partitions, means for actuating the said piston, so that it pushes the capsule for a distance out of the partition, a mouth piece, which is located at the said chamber and on which the capsule is threaded and means for pushing matches, etc., from the said chamber, through the said mouth piece and into the capsule.

9. In a machine for making capsules from sheets of paper or the like and charging the same with matches, cigarettes or similar articles, the combination with a fold table and side folders, of a plurality of mandrels, moved in an endless path and passing successively through the said fold table, the said sheets being folded around the said mandrels respectively, means for folding the end flaps of the capsules against the end of the mandrels respectively, partitions moved in an endless path having such a position, that each of the partitions during their motion is located in front of one of the mandrels carrying a folded capsule, an ejector provided in each of the said mandrels, means for actuating the ejector of that mandrel, which registers with one of the partitions, so that the ejector pushes the folded capsule into the said partition, a chamber containing matches, etc., means for transmitting matches, etc., from the said chamber into the capsules respectively contained in the said partitions, a swingable folder for folding one of the flaps of the open capsule containing matches, etc., a stationary folder, which is located near the path of the partitions and folds the opposite flap of the said end, stationary folders, located at opposite sides of the path of the partitions and consisting of plates or the like, the operating surfaces of which successively change from a position substantially parallel to the partitions to a position forming substantially right angles to the same, a receptacle containing paste, and means for transmitting paste to that end flap which is folded last.

10. In a machine for making capsules from sheets of paper or the like and charging the same with matches, cigarettes or similar articles, the combination with a fold table and side folders, of a plurality of mandrels, moved in an endless path and passing successively through the said fold table, the said sheets being folded around the said mandrels respectively, means for folding the end flaps of the capsules against the ends of the mandrels respectively, partitions moved in an endless path having such a position, that each of the partitions during their motion is located in front of one of the mandrels carrying a folded capsule, an ejector provided in each of the said mandrels, means for actuating the ejector of that mandrel, which registers with one of the partitions, so that the ejector pushes the folded capsule into the said portion, a chamber containing matches, etc., means for transmitting matches, etc., from the said chamber into the capsules respectively contained in the said partitions, and means for folding the end flaps of the capsules charged with matches, etc., and pasting together the same, each of the capsules containing matches, etc., and closed being pushed from its partition by the said ejector, while pushing a capsule into the same partition.

In witness whereof, we have hereunto signed our names.

GUNNAR CHRISTIAN EKSTRÖM.
BROR ANDERS EMIL JOHNSON.
GUSTAF ÖRSTRÖM.